United States Patent
Chuang et al.

(10) Patent No.: US 7,124,269 B2
(45) Date of Patent: Oct. 17, 2006

(54) MEMORY CONTROLLER INCLUDING DATA CLEARING MODULE

(75) Inventors: Eric Chuang, Taipei Hsien (TW); Macalas Yen, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 299 days.

(21) Appl. No.: 10/708,796

(22) Filed: Mar. 26, 2004

(65) Prior Publication Data

US 2005/0055525 A1    Mar. 10, 2005

(30) Foreign Application Priority Data

Sep. 8, 2003    (TW)    ............................. 92124738 A

(51) Int. Cl.
  *G06F 12/00*    (2006.01)
(52) U.S. Cl. ..................... 711/166; 711/154; 711/206
(58) Field of Classification Search ................ 711/154, 711/206, 166; 365/218
  See application file for complete search history.

(56) References Cited

U.S. PATENT DOCUMENTS

| | | | | |
|---|---|---|---|---|
| 6,484,270 B1 * | 11/2002 | Odani | ............................. | 714/6 |
| 6,496,411 B1 * | 12/2002 | Yamada et al. | ......... | 365/185.03 |
| 6,906,954 B1 * | 6/2005 | Shukuri et al. | ......... | 365/185.05 |
| 2002/0013879 A1 * | 1/2002 | Han | ............................. | 711/103 |
| 2003/0131185 A1 * | 7/2003 | Dover | ......................... | 711/103 |
| 2004/0078513 A1 * | 4/2004 | Yamazaki | .................... | 711/104 |
| 2004/0264234 A1 * | 12/2004 | Moore et al. | ................ | 365/148 |
| 2005/0055488 A1 * | 3/2005 | Chuang et al. | ............. | 710/308 |

OTHER PUBLICATIONS

Intel 815 Chipset family: 82815 Graphics and Memory Controller Hub (GMCH) Jan. 2003, Fig. 1 pp. 11 and 15.*

* cited by examiner

*Primary Examiner*—Hong Kim
(74) *Attorney, Agent, or Firm*—Winston Hsu

(57) ABSTRACT

A computer system includes a processor, and a memory controller electrically connected to the processor and the memory for controlling the accessing operations of the memory. The method includes the processor generating a predetermined logic value and delivering the predetermined logic value to the memory controller, and the memory controller repeatedly overwriting data stored in the plurality of memory units by the predetermined logic value.

11 Claims, 4 Drawing Sheets

MEMORY CONTROLLER INCLUDING DATA CLEARING MODULE

BACKGROUND OF INVENTION

1. Field of the Invention

The present invention relates to a method and related apparatus for clearing data in a memory, and more particularly, to a method and related apparatus for clearing data in a memory without the involvement of a CPU.

2. Description of the Prior Art

FIG. 1 is a schematic diagram of a conventional computer system 10. As shown in FIG. 1, the computer system 10 includes a CPU 12, a north bridge circuit 14, a south bridge circuit 16, a display controller 18, a display 19, a memory 20, a hard disk 22, and an input device 24. The memory 20 includes a plurality of memory units 26 arranged in arrays, i.e., each memory unit 26 corresponds to a column address and a row address. The accessing operations of the memory 20 are controlled via a memory controller 30 positioned in the north bridge circuit 14. The memory controller 30 includes an address register 32 and a data register 34 where the address register 32 is for storing memory addresses, and the data register 34 is for storing data to be written to the memory 20 and data read from the memory 20.

For the computer system 10, any executed programs, for example a driver or an application program, require the memory 20 for storing data. When a first application program is executed, a memory block of the memory 20 is designated for storing operation data of the first application program. While the first application program is closed, the memory block must be released so that other programs can use this memory block to store data. In addition to release the memory block, however, the first application program must clear the memory block, by for example overwriting the data stored in each memory unit 26 of the memory block with a logic value "1" or "0". In such case, a second application program executed thereafter, can correctly access data in the same memory block. If that memory block is not cleared, errors due to misjudgment may occur when the second application program is executed. These errors may even lead to the crash of the computer system 10.

Therefore, when a program requires a certain capacity of memory units 26 in the memory 20 to store operation data, that certain capacity of memory units 26 must be overwritten with logic values "1" or "0". For example, if the CPU 12 executes the program codes of clearing data, the CPU will output the memory addresses corresponding to the memory units 26 to be used to the address register 32. Meanwhile, the CPU 12 will repeatedly output the logic value "1" or "0" to the data register 34. If the capacity of the memory 20 to be used is 3 MB, the CPU 12 will output the logic values "1" to the data register 34 24 million times for clearing 24 million memory units 26 (corresponding to 3 MB capacity) in the memory 20. It can be seen that the CPU 12 spends much time repeatedly outputting the logic value "1" or "0" to the memory 20, thereby reducing its efficiency. In addition to reducing the efficiency of the CPU 12, the limited bandwidth of the front-side bus (FSB) between the CPU 12 and the north bridge circuit 14 is also consumed. This also affects the total efficiency of the computer system 10.

SUMMARY OF INVENTION

It is therefore a primary objective of the present invention to provide a method and related apparatus of clearing data in a memory for solving the above problems.

According to the claimed invention, a method of clearing data in a memory of a computer system is disclosed. The computer system includes a processor, and a memory controller electrically connected to the processor and the memory for controlling the accessing operations of the memory. The method includes the processor generating a predetermined logic value and delivering the predetermined logic value to the memory controller, and the memory controller repeatedly overwriting data stored in the plurality of memory units by the predetermined logic value.

The claimed invention further includes a computer system including a processor for controlling operations of the computer system, a memory having a plurality of memory units for respectively storing a data, and a memory controller electrically connected to the processor and the memory. The memory controller includes an address register for storing a plurality of memory addresses corresponding to the plurality of memory units, a data register, and a data clear module for transmitting a predetermined logic value generated by the processor to the data register so that the predetermined logic value overwrites data stored in the plurality of memory units one by one.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
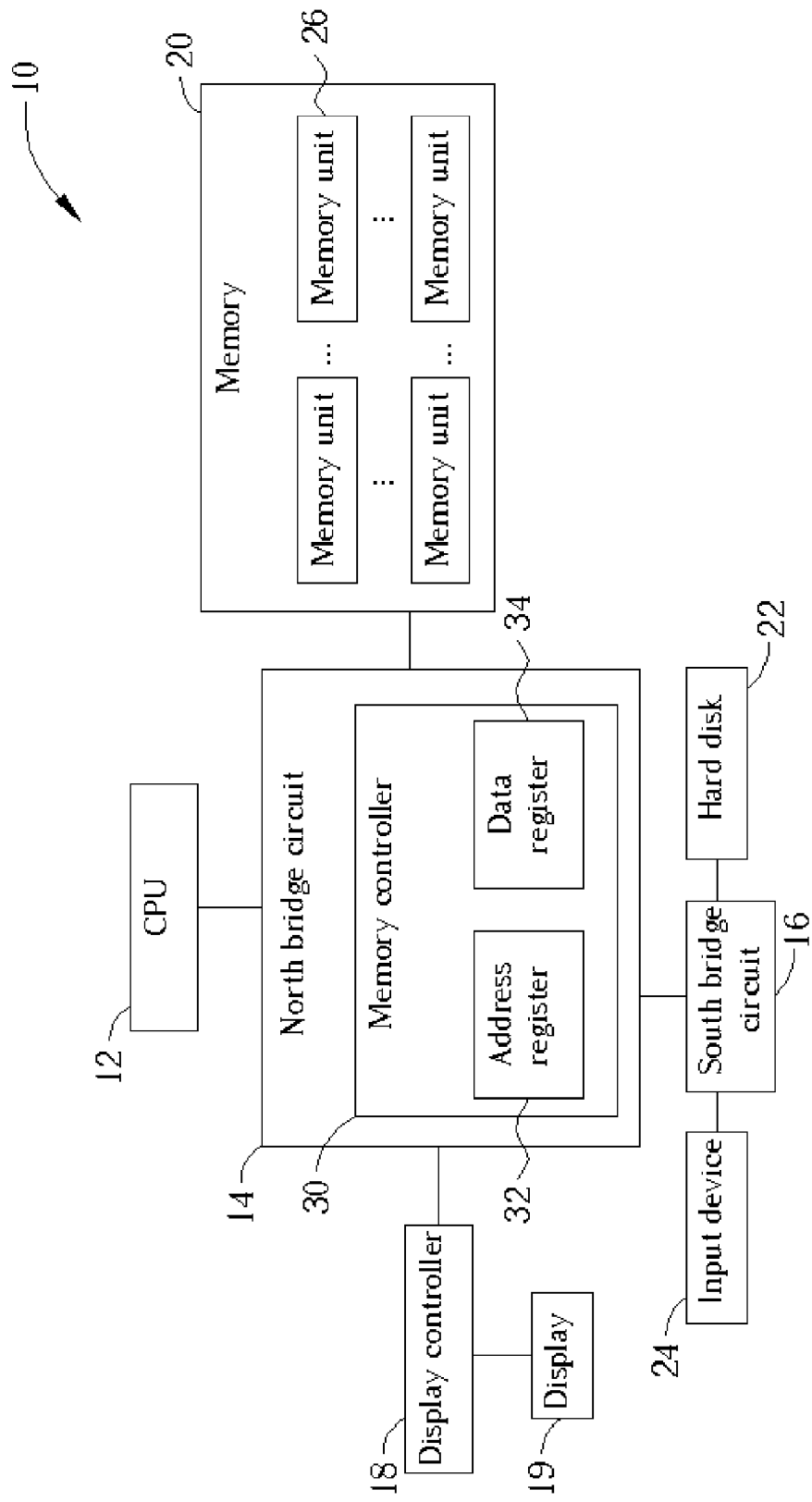
FIG. 1 is a schematic diagram of a conventional computer system 10.
Figure 2:
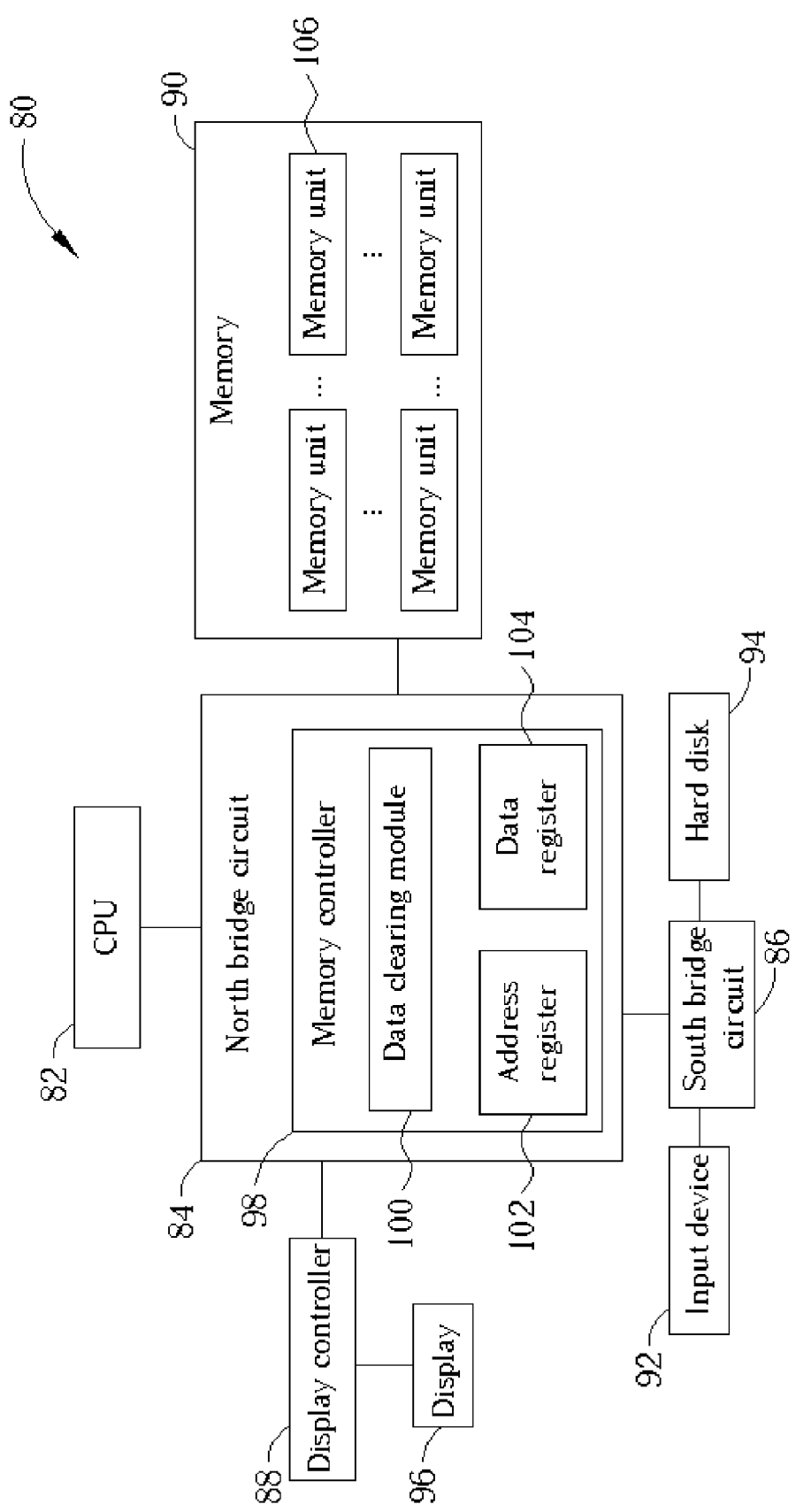
FIG. 2 is a schematic diagram of a computer system according to a first embodiment of the present invention.

FIG. 2 is a schematic diagram of a computer system 80 according to a first preferred embodiment of the present invention. As shown in FIG. 2, the computer system 80 includes a CPU 82, a north bridge circuit 84, a south bridge circuit 86, a display controller 88, a memory 90, an input device 92, a hard disk 94, and a display 96. The north bridge circuit 84 has a memory controller 98, and the memory controller 98 includes a data clear module 100, an address register 102, and a data register 104. The memory 90 includes a plurality of memory units 106 arranged in arrays, i.e., each memory unit 106 corresponds to a column address and a row address. The memory controller 98 is for controlling accessing operations of the memory 90. The address register 102 is for storing memory addresses, and the data register 104 is for storing data to be written to the memory 90 or data to be read from the memory 90. The data clear module 100 can output a predetermined logic value (such as "1" or "0") to overwrite the memory units 106 of the memory 90 so as to clear any data in the memory units 106. Therefore, the memory controller 98 is capable of deleting data stored in the memory in virtue of the installation of the data clear module 100.

The mechanism of the data clear module 100 is demonstrated as follows. When the computer system 80 starts, an operating system is loaded first. Then the user inputs an instruction via the input device 92 for executing an application program. The application program will be allotted a portion of the memory units 106 of the memory 90 for storing operation data. Those memory units 106 used for storing operation data must be cleared by the application program to prevent operation errors. Therefore, the CPU 82 delivers a control instruction to the memory controller 98 for starting the data clear module 100. In addition, the CPU 82 also delivers the memory addresses corresponding to the memory units 106 to be cleared to the address register 102. Accordingly, the data clear module 100 can select the logic value "1" or "0" to overwrite data stored in the portion of the memory units 106.

As described, instead of outputting the logic value repeatedly to the data register 104, the logic value is generated by the CPU 82 and only has to be delivered to the data clear module 100 once when clearing data. Therefore, the efficiency of the CPU 82 is improved. In addition, since the CPU 82 does not need to repeatedly deliver the logic value to the data register 104, it only has to directly output the logic value to the data clear module 100 once. The bandwidth of the FSB between the CPU 82 and the north bridge circuit 84 is not consumed.

Figure 3:
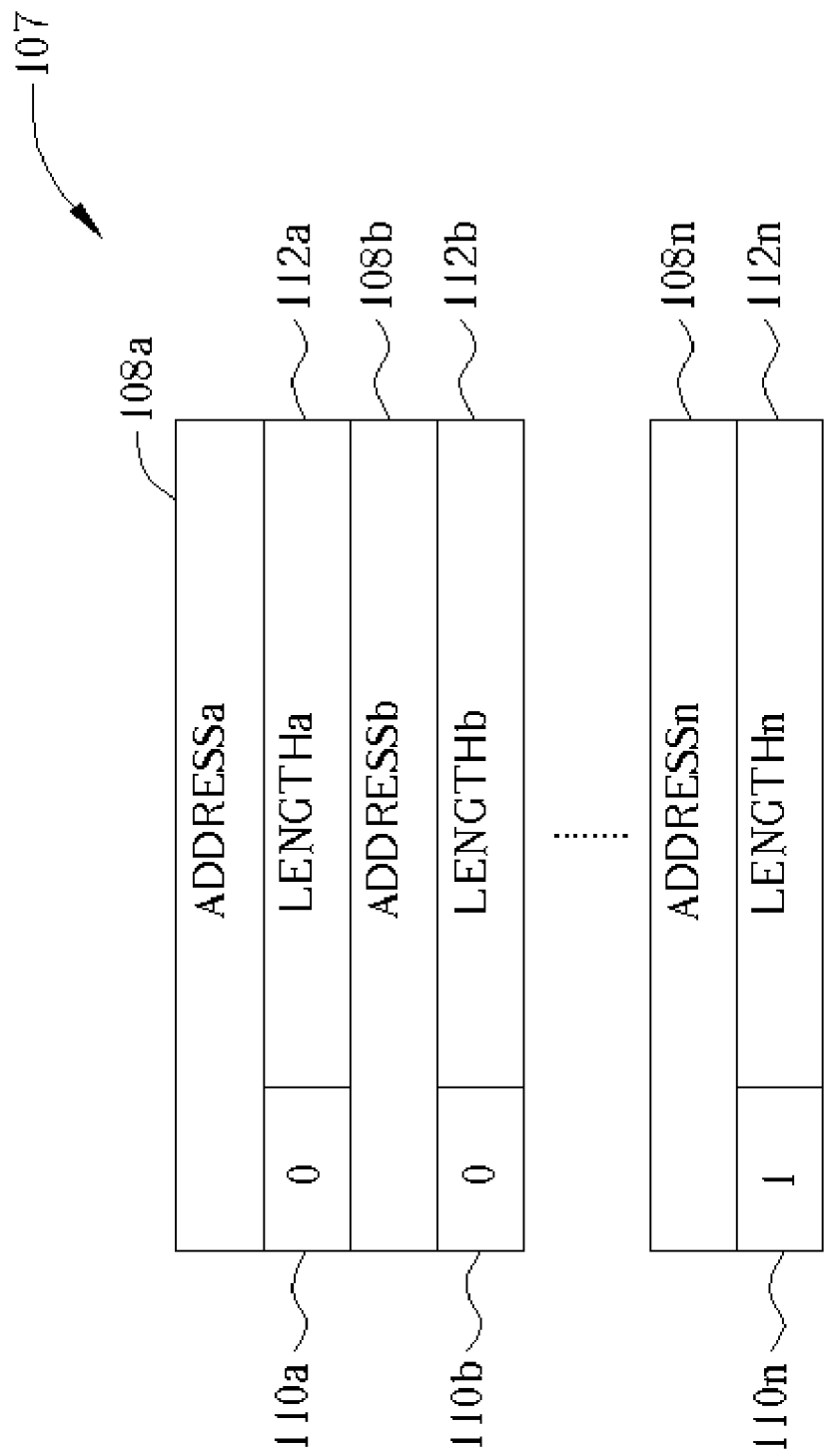
FIG. 3 is a memory address table of the present invention.

In addition, if the data to be cleared includes a plurality of data bits, the memory controller 98 generally uses physical memory addresses (for example a memory address table) to access memory units 106 of the memory 90. FIG. 3 is a schematic diagram of a memory address table 107. As shown in FIG. 3, the memory address table 107 includes three kinds of fields where fields 108$a$, 108$b$, and 108$n$ record the physical memory addresses, fields 110$a$, 110$b$, and 110$n$ record flags which represent whether the data is an end portion (end of file, EOF), and fields 112$a$, 112$b$, 112$n$ designate a bit length of each physical memory address recorded in fields 108.

For example, if a program (an application or a driver) has to clear the data stored in a plurality of memory units 106 in the memory 90, the program first generates the memory address table 107 via the operation system of the computer system 80, and stores the memory address table 107 in a predetermined memory block of the memory 90. Then, the CPU 82 executes the program codes of the program, and thus outputs a control instruction to the memory controller 98 so as to start the data clear module 100. While being started, the data clear module 100 reads the memory address table 107 in order to distinguish exactly the physical memory addresses to be cleared. Consequently, the data clear module 100 can read a memory address ADDRESSa recorded in field 108$a$, and consecutively clear a plurality of data bits from the memory address ADDRESSa according to a bit length LENGTHa recorded in field 112$a$. In other words, the physical memory addresses corresponding to the plurality of data bits are consecutively written to the address register 102 (e.g. the data bits from ADDRESSa to ADDRESSa+(LENGTHa-1) or from ADDRESSa to ADDRESSa-(LENGTHa-1)), so that the data register 104 overwrites data stored in the memory units 106 corresponding to the physical memory addresses with the logic value ("1" or "0"). In addition, since the flag recorded in field 110$a$ is "0" which means the data is not an end portion, the data clear module 100 keeps on reading a memory address ADDRESSb in field 108$b$, and clearing a plurality of data bits of a length LENGTHb according to a bit length LENGTHb recorded in field 112$b$. Again since the flag recorded in field 110$b$ is "0", the data clear module 100 continues to clear data according to the memory address table 107. After the data clear module 100 reads a memory address ADDRESSn recorded in field 108$n$, and clears a plurality of data bits having a bit length LENGTHn recorded in field 112$n$, the data clear module 100 stops reading memory addresses and clearing data bits since the flag recorded in field 110$n$ is "1", which means the data is an end portion.

It is worth noting that in the above case the physical memory addresses are discontinuous, therefore the memory address table 107 is necessary for the data clear module 100 to clear data. If the physical memory addresses corresponding to the memory units 106 are continuous, the computer system 80 only has to provide a source memory address and the bit length of the data for the data clear module 100. The data clear module 100 can therefore consecutively clear data according to the source memory address and the bit length of the data.

Figure 4:
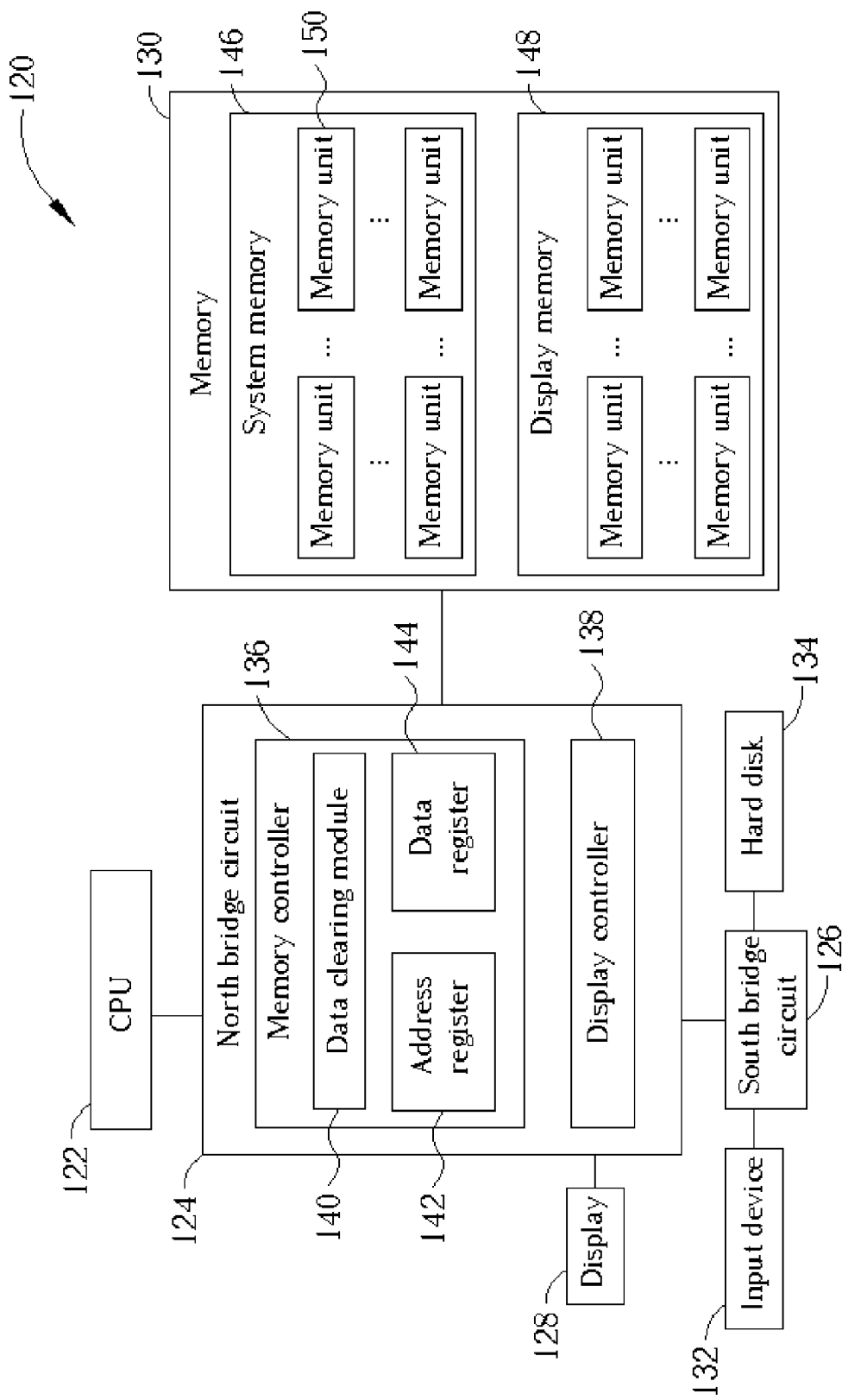
FIG. 4 is a schematic diagram of another computer system according to a second embodiment of the present invention.

FIG. 4 is a schematic diagram of a computer system 120 according to a second preferred embodiment of the present invention. As shown in FIG. 4, the computer system 120 includes a CPU 122, a north bridge circuit 124, a south bridge circuit 126, a display 128, a memory 130, an input device 132, and a hard disk 134. The north bridge circuit 124 includes a memory controller 136 and a display controller 138. The memory controller 136 includes a data clear module 140, an address register 142, and a data register 144. In this embodiment, the memory 130, which comprises a plurality of memory units 150 arranged in arrays, is divided into a system memory 146 and a display memory 148.

Similar to the first embodiment, the data clear module 140 can clear data bits stored in the plurality of memory units 150 whether the corresponding physical memory addresses are continuous or discontinuous. If the physical memory addresses are discontinuous, the data clear module 140 can implement the clearing operation via a memory address table. If the physical memory addresses are continuous, the data clear module 140 only requires a source memory address and a bit length of the data to be clear, for clearing the data bits stored in the memory units 150 corresponding to the physical memory addresses.

It is to be noted that the data clear module 140 can also clear the memory units 150 of the display memory 148. Normally, the display controller 138 uses the display memory 148 to store operation data of 2D and 3D graphic calculations. The display memory 148 includes an image buffer zone and a Z buffer zone, where the image buffer is for storing the display data (e.g. gray scale value) of each pixel in the display 128, and the Z buffer is for storing the relative depth value of the display data in each pixel. After the display controller 138 reads the display data stored in the image buffer to drive the display 128 for displaying an image, the display controller 138 must clear data stored in the image buffer and in the Z buffer before next image is displayed. In such case, the CPU 122 will output a logic value to the data clear module 140 once, and the memory addresses of the memory units 150 corresponding to the image buffer and the Z buffer to the address register 142. Meanwhile, the data clear module 140 starts to output a predetermined logic value ("1" or "0") to the data register 144 so that the data clear module 140 can overwrite the memory units 150 corresponding to the image buffer and the Z buffer with the predetermined logic value according to the memory addresses held in the address register 142.

Since the data clear module 140 can clear data of the display memory 148 without the involvement of the CPU 122, the CPU 122 can save more resources for other programs. In addition, since the limited bandwidth of the FSB between the CPU 122 and the north bridge circuit 124 is not consumed, the computer system 120 is more efficient.

Those skilled in the art will readily appreciate that numerous modifications and alterations of the device may be made without departing from the scope of the present invention. Accordingly, the above disclosure should be construed as limited only by the metes and bounds of the appended claims.

What is claimed is:

1. A method of clearing data in a memory of a computer system, the computer system comprising a processor, and a memory controller electrically connected to the processor and the memory for controlling accessing operations of the memory, the memory comprising a plurality of memory units, the method comprising:

the processor generating a predetermined logic value, and delivering the predetermined logic value to the memory controller; and the memory controller consecutively overwriting data stored in the plurality of memory units by the predetermined logic value;

wherein if the plurality of memory units have discontinuous addresses, a memory address table is provided to the memory controller for writing the predetermined logic value to the plurality of memory units, the memory address table comprising a plurality of fields, each field including a physical memory address, a bit length, and a flag for respectively recording a start address, a bit length, and indicating whether data is an end portion.

2. The method of claim 1 wherein if the plurality of memory units have continuous addresses, a source memory address and a bit length are delivered to the memory controller.

3. The method of claim 1 wherein the predetermined logic value is "0" or "1".

4. A computer system comprising:

a processor for controlling operations of the computer system;

a memory including a plurality of memory units for storing data; and a memory controller electrically connected to the processor and the memory, the memory controller comprising:

an address register for storing a plurality of memory addresses corresponding to the plurality of memory units;

a data register; and a data clear module for transmitting a predetermined logic value generated by the processor to the data register so that the predetermined logic value consecutively overwrites data stored in the plurality of memory units one by one;

wherein if the plurality of memory units have discontinuous addresses, a memory address table is provided to the memory controller for writing the predetermined logic value to the plurality of memory units, the memory address table comprising a plurality of fields, each field including a physical memory address, a bit length, and a flag for respectively recording a start address, a bit length, and indicating whether data is an end portion.

5. The computer system of claim 4 wherein if the plurality of memory units have continuous addresses, the data clear module will generate a plurality of memory addresses according to a source memory address and a bit length, and deliver the plurality of memory addresses to the address register so as to write the predetermined logic value to the memory units corresponding to the plurality of memory addresses.

6. The computer system of claim 4 wherein if the plurality of memory units have discontinuous addresses, the data clear module utilizes the memory address table for generating a plurality of memory addresses to the address register, and writes the predetermined logic value to the plurality or memory units corresponding to the plurality of memory addresses.

7. The computer system of claim 6 wherein the memory address table is generated by an operating system of the computer system.

8. The computer system of claim 4 wherein the memory controller is installed in a north bridge circuit.

9. The computer system or claim 8 wherein the north bridge circuit further comprises a display controller to generate image signals for driving a display device of the computer system.

10. The computer system of claim 9 wherein the memory comprises a display memory for storing operation data of the display controller, and a system memory for storing operation data of the processor.

11. The computer system of claim 10 wherein the plurality of memory units are located in the display memory or in the system memory.

* * * * *